United States Patent
Machimura et al.

(10) Patent No.: US 7,394,812 B2
(45) Date of Patent: Jul. 1, 2008

(54) APPARATUS AND METHOD FOR PROCESSING INFORMATIONAL SIGNAL

(75) Inventors: Masanori Machimura, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 623 days.

(21) Appl. No.: 11/004,863

(22) Filed: Dec. 7, 2004

(65) Prior Publication Data
US 2005/0135427 A1    Jun. 23, 2005

(30) Foreign Application Priority Data
Dec. 19, 2003    (JP)    ............................. 2003-423254

(51) Int. Cl.
*H04L 12/28* (2006.01)
(52) U.S. Cl. ...................................... 370/392
(58) Field of Classification Search ................ 370/351, 370/389, 392, 400, 464, 465, 474; 709/201, 709/223, 227, 230, 245
See application file for complete search history.

(56) References Cited

U.S. PATENT DOCUMENTS

| | | | | |
|---|---|---|---|---|
| 5,394,402 A | * | 2/1995 | Ross | ........................... 370/402 |
| 5,920,566 A | * | 7/1999 | Hendel et al. | ................ 370/401 |
| 6,032,190 A | * | 2/2000 | Bremer et al. | .............. 709/238 |
| 6,633,565 B1 | * | 10/2003 | Bronstein et al. | ............ 370/392 |
| 6,862,320 B1 | * | 3/2005 | Isu et al. | ................. 375/240.27 |
| 7,012,890 B2 | * | 3/2006 | Yazaki et al. | ................ 370/229 |
| 7,068,656 B2 | * | 6/2006 | Sainomoto et al. | ........... 370/392 |

\* cited by examiner

*Primary Examiner*—Dmitry Levitan
(74) *Attorney, Agent, or Firm*—Oblon, Spivak, McClelland, Maier & Neustadt, P.C.

(57) ABSTRACT

A control portion decides whether received transmission data is destined for the processing board itself, based on a board ID included in a beginning header of the headers separated from the transmission data. If such is the case, a signal-processing portion processes an image signal separated from the transmission data or directly input, based on processing information (command and control parameter) included in the beginning header. A header generation portion generates a header to be combined with a processed image signal, based on the processing information included in the header. The header is combined with the image data to obtain transmission data. The processing board determines a transmission destination by itself.

15 Claims, 9 Drawing Sheets

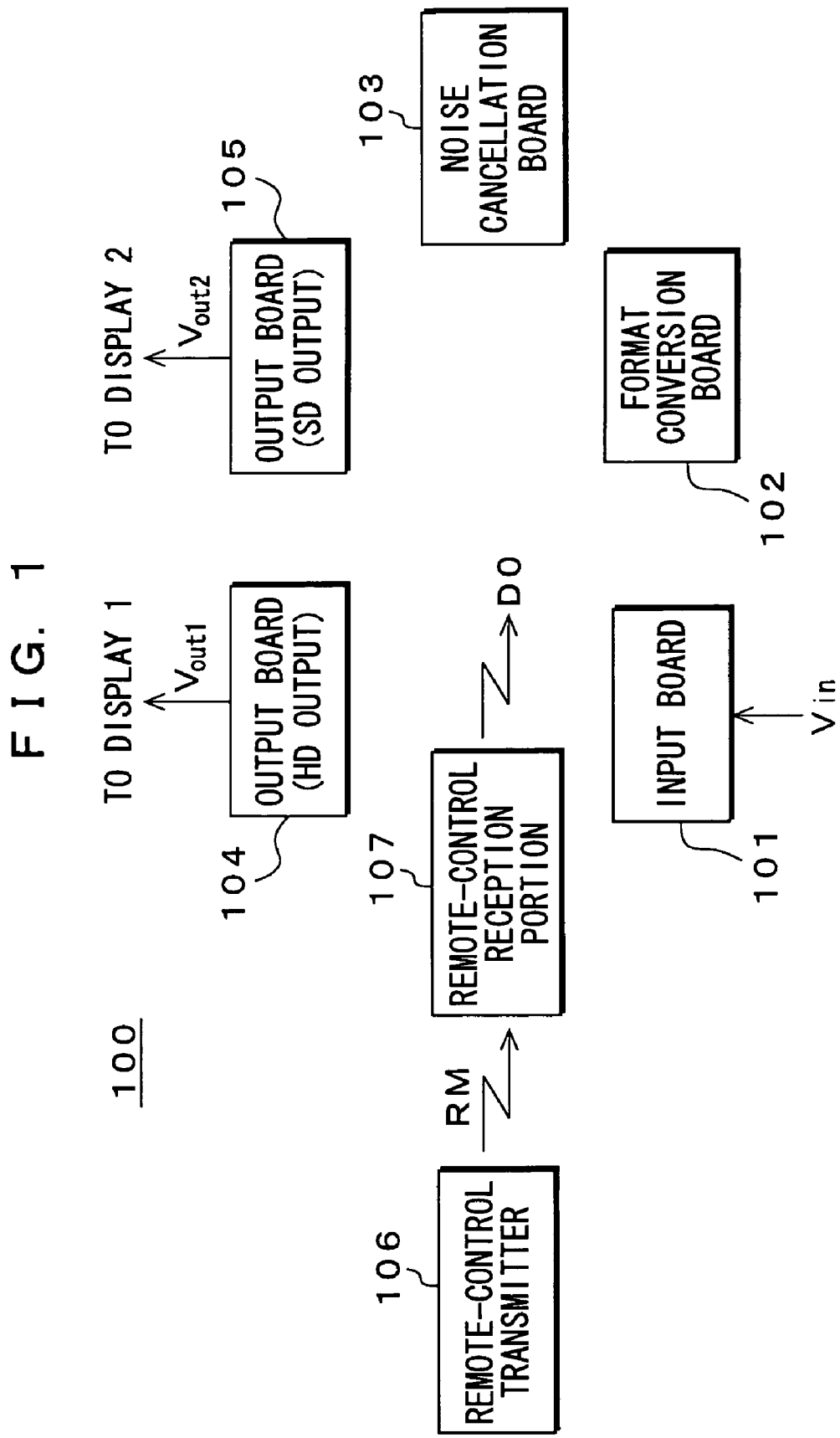

FIG. 2

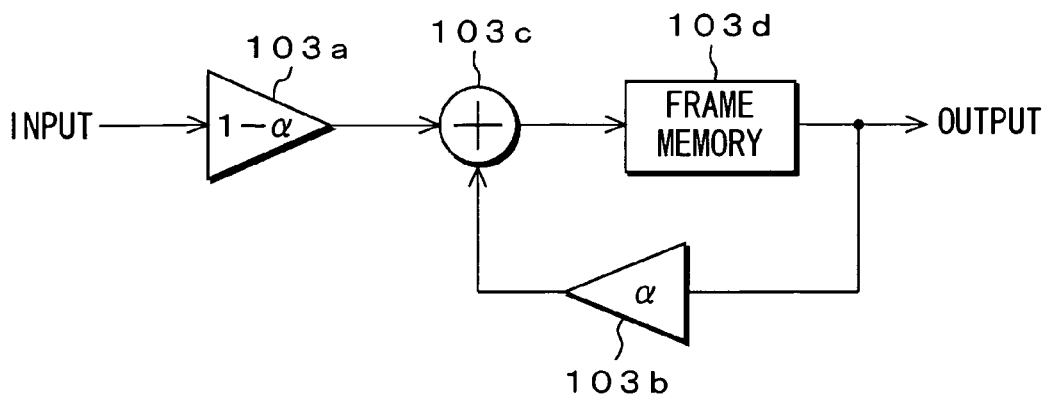

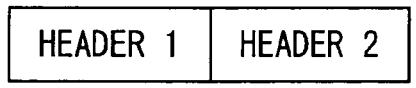

FIG. 3A
(D0)

| HEADER 1 | HEADER 2 |
|---|---|

FIG. 3B
(HEADER 1)

| TRANSMISSION DESTINATION ID | COMMAND | CONTROL PARAMETER |
|---|---|---|
| BOARD ID OF INPUT BOARD 101 | INPUT SD SIGNAL | RGB SCHEME OR YCbCr SCHEME (480i) |
| | OR INPUT HD SIGNAL | RGB SCHEME OR YCbCr SCHEME (1080i OR 720p) |

FIG. 3C
(HEADER 2)

| TRANSMISSION DESTINATION ID | COMMAND | CONTROL PARAMETER |
|---|---|---|
| BOARD ID OF OUTPUT BOARD 104 | OUTPUT HD SIGNAL | RGB SCHEME OR YCbCr SCHEME (1080i OR 720p) |
| OR BOARD ID OF OUTPUT BOARD 105 | OUTPUT SD SIGNAL | RGB SCHEME OR YCbCr SCHEME (480i) |

(D_out)

(D_out)

FIG. 6A (D_out)
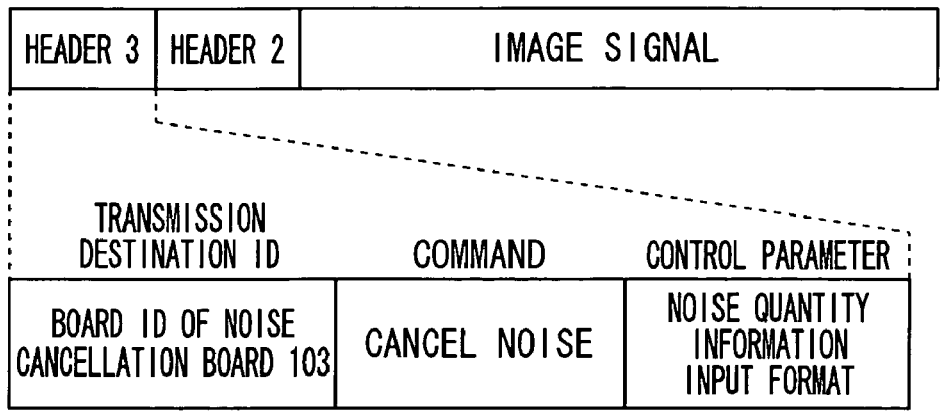
FIG. 6B (D_out)
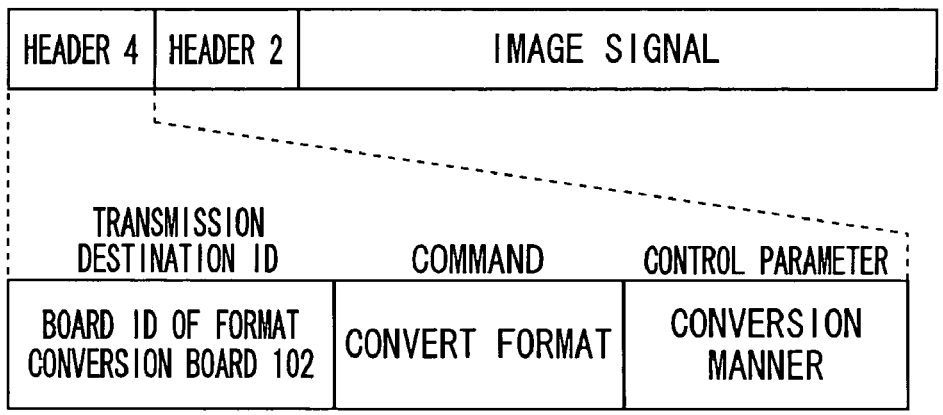
FIG. 6C (D_out)

FIG. 8
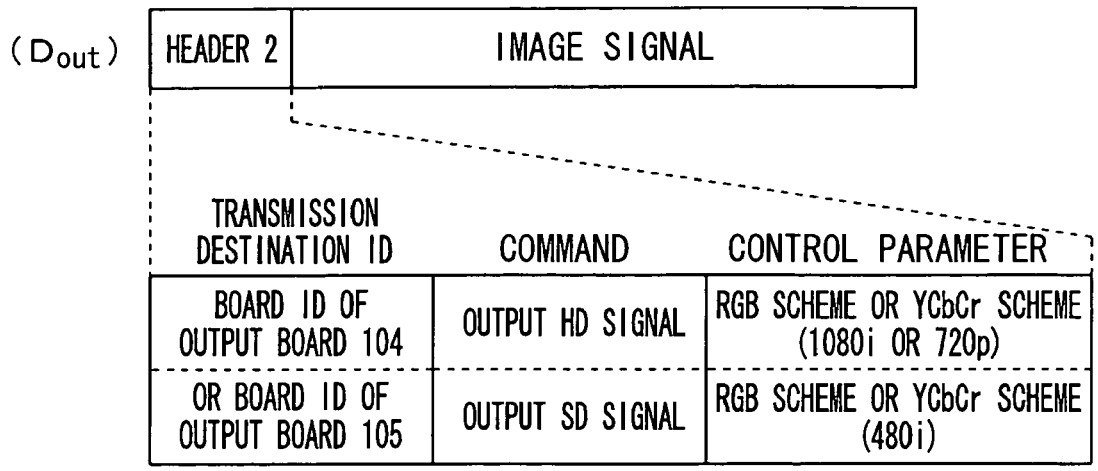
FIG. 9A (D0)
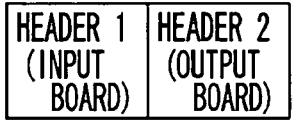
FIG. 9B (Dout)
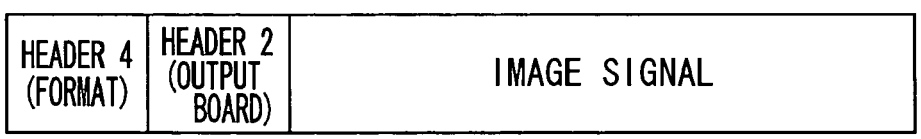
FIG. 9C (Dout)
FIG. 9D (Vout1)

(D0)

($D_{out}$)

($D_{out}$)

($D_{out}$)

($V_{out1}$)

APPARATUS AND METHOD FOR PROCESSING INFORMATIONAL SIGNAL

BACKGROUND OF THE INVENTION

1. Field of the Invention

The present invention relates to an apparatus and a method for processing an informational signal. More specifically, it relates to an apparatus and a medium for processing an informational signal, a processing board for processing an informational signal, an informational-signal-processing system, a program product and a recording medium for recording the program, which are well applicable to, for example, an image-signal-processing system etc. for performing a series of processing procedures such as format conversion and noise cancellation on an image signal and outputting a processing result.

2. Description of Related Art

In an image-signal-processing system for performing a series of processing procedures such as the format conversion and the noise cancellation on an image signal and outputting the processing result, it has been conventionally considered to implement this series of processing procedures by using plural processing boards. In this case, for example, when a format in which the image signals are input or output is changed or another processing board is added, an order in which the image signals are processed changes, so that it is necessary to replace the board or change wiring between the boards.

Japanese Patent Application Publication No. 2003-1798211 discloses communication of data between the boards by radio, thereby eliminating restrictions on signals flowing between the boards, and avoiding a troublesome job such as replacement of these boards and changing of inter-board wiring.

In the image-signal-processing system disclosed in the above publication, a controller is used. The controller recognizes plural processing boards installed therein and sets a processing order of image signals based on a table stored in a built-in memory. Thus, the image-signal-processing system disclosed in the publication has such the controller in addition to the processing boards so that its circuit scale is enlarged by the amount thereof. Further, in the image-signal-processing system, a communication between the controller and each processing board is executed when setting a processing order of image signals. This causes communication control to be complicated.

It is an object of the invention to improve the existing apparatus for processing informational signal, and the like by which, when input or output format of the informational signal is changed in, for example, the image-signal-processing system using plural processing boards or an processing board is added thereinto, it is possible to easily perform setting of processing order of informational signals without using a controller performing any complicated communication control such that the controller can control each processing board.

SUMMARY OF THE INVENTION

According to an aspect of the invention, is provided an apparatus for processing informational signal. The apparatus comprises data-receiving means for receiving transmission data having a first header. The first header includes at least transmission destination information and processing information of transmission destination. The apparatus also comprises decision means for deciding whether the transmission data received by the data receiving means is destined for the apparatus itself for processing informational signal, based on the transmission destination information included in the first header. The apparatus further comprises signal-processing means for processing informational signal based on the processing information included in the first header if the decision means decides that the transmission data is destined for the apparatus itself. The apparatus additionally comprises header-generating means for generating, based on the information included in the first header, a second header that includes at least transmission destination information and processing information of transmission destination relative to the informational signal obtained by processing in the signal-processing means. The apparatus still further comprises data-transmitting means for transmitting transmission data comprised of the informational signal obtained by the processing in the signal-processing means and the second header generated by the header-generating means.

According to another aspect of the invention, is provided a method for processing informational signal. The method comprises a data reception step of receiving transmission data having a first header. The first header includes at least transmission destination information and processing information of transmission destination. The method also comprises a decision step of deciding whether the transmission data received in the data reception step is destined for the apparatus itself for processing informational signal, based on the transmission destination information included in the first header. The method further comprises a signal-processing step of processing informational signal based on the processing information included in the first header if the decision step decides that the transmission data is destined for the apparatus itself. The method additionally comprises a header generation step of generating, based on the information included in the first header, a second header that includes at least transmission destination information and processing information of transmission destination relative to the informational signal obtained by processing in the signal-processing step. The method still further comprises a data transmission step of transmitting transmission data comprised of the informational signal obtained by the processing at the signal-processing step and the second header generated by the header generation step.

According to further aspect of the invention, is provided a program product for causing a computer to perform the above-mentioned method for processing informational signal. According to still further aspect of the invention, is provided a computer-readable medium for recording the above-mentioned program.

According to additional aspect of the invention, is provided a processing board for processing informational signal. The processing board comprises data receiver for receiving transmission data having a first header. The first header includes at least transmission destination information and processing information of transmission destination. The processing board also comprises decision device for deciding whether the transmission data received by the data receiver is destined for the processing board itself, based on the transmission destination information included in the first header. The processing board further comprises signal processor for processing informational signal based on the processing information included in the first header if the decision device decides that the transmission data is destined for the processing board itself. The processing board additionally comprises header generator for generating, based on the information included in the first header, a second header that includes at least transmission destination information and processing information of transmission destination relative to the informational signal obtained by processing in the signal processor. The processing board still further comprises data transmitter for transmitting transmission data comprised of the informational signal obtained by the processing in the signal processor and the second header generated by the header generator.

According to further aspect of the invention, is provided an informational-signal-processing system having plural apparatuses for processing informational signal. Each apparatus performs predetermined processing on each input informational signal. The apparatus comprises the above-mentioned data-receiving means, decision means, signal-processing means, header-generating means, and data-transmitting means.

In a preferred embodiment of the apparatus for processing informational signal (the processing board) of the invention, transmission data is received. The transmission data has a first header including at least transmission destination information and processing information of transmission destination. Based on the transmission destination information included in the first header, it is decided whether the transmission data is destined for the apparatus (the processing board) itself for processing informational signal. If the transmission data is destined for the apparatus itself, informational signal is processed based on the processing information included in the first header. The processing information is composed of, for example, a command for performing predetermined processing and a control parameter used when performing the command.

The information signal to be processed is supplied with it being separated from the received transmission data or supplied independently of the received transmission data. The informational signal includes image signal, audio signal, and both. The first header of the received transmission data includes a first sub-header and a second sub-header. In this case, it is decided whether the transmission data is destined for the apparatus itself, based on transmission destination information included in the first sub-header. The second sub-header includes at least transmission destination information of a final transmission destination and processing information of final transmission destination. Based on the information included in the first header of the received transmission data, a second header that includes at least transmission destination information and processing information of transmission destination relative to the informational signal thus processed is obtained. For example, if the first header of the received transmission data includes the first sub-header and the second sub-header, as described above, when next destination is not a final destination, only the first sub-header portion is changed to provide second header while when next destination is a final destination, the first sub-header is deleted therefrom and the second sub-header is provided as second header as it is. The transmission data comprised of the informational signal obtained by the processing in the signal-processing means (signal processor) and the second header thus generated by the header-generating means (header generator) is transmitted to another apparatus for processing informational signal (another processing board). The second header thus generated can be combined with the processed informational signal, to generate transmission data. The transmission data is transmitted.

Thus, the apparatus for processing informational signal (the processing board) determines a transmission destination by itself, based on the information included in the first header of the received transmission data. This is completely different from the apparatus for processing informational signal in which the controller controls the transmission destination. In the informational-signal-processing system having plural processing boards, for example, this allows setting process of processing order for the informational signal to be easily done when input or output format of the informational signal or the like is changed.

The apparatus for processing informational signal can comprise information acquiring means for acquiring information that indicates a state of the informational signal obtained by processing in the signal processing means. In this case, the header-generating means determines a transmission destination indicated by the transmission destination information included in the second header based on information included in the first header of the received transmission data and information acquired by the information acquiring means. Thus, the apparatus for processing informational signal (the processing board) can determine a transmission destination of the processed informational signal according to the state of informational signal. For example, if the apparatus for processing informational signal is used for noise cancellation processing, it is determined so that the destination can be set to the apparatus for processing informational signal that is used for the noise cancellation processing when the informational signal includes a much amount of noise. On the other hand, it is determined so that the destination can be set to an apparatus for processing informational signal following the apparatus for processing informational signal that is used for performing the noise cancellation processing when the informational signal includes a less amount of noise.

The apparatus for processing informational signal can comprise a signal-receiving means (signal receiver) for receiving a state signal, transmitted from another apparatus for processing informational signal. The state signal indicates either a state that another apparatus for processing the informational signal is usable or a state that another apparatus for processing the informational signal is unusable. The header-generating means can determine a transmission destination indicated by the transmission destination information included in the second header based on the information included in the first header of the received transmission data and the state signal received by the signal-receiving means. Thus, the apparatus for processing informational signal (the processing board) can determine a transmission destination of the processed informational signal according to a state on whether another apparatus for processing the informational signal is usable or not. For example, if an apparatus for processing informational signal that is used for noise cancellation processing is added thereinto so that it is usable, the destination can be changed to this apparatus for processing informational signal that is used for the noise cancellation processing. On the other hand, if an apparatus for processing informational signal that is used for noise cancellation processing is unusable, the destination can be changed to an apparatus for processing informational signal following the apparatus for processing informational signal that is used for performing the noise cancellation processing.

The apparatus for processing informational signal can comprise a signal-transmitting means (signal transmitter) for transmitting a state signal to another apparatus for processing informational signal. The state signal indicates either a state that the apparatus for processing informational signal is usable or a state that the apparatus for processing informational signal is unusable. For example, the apparatus for processing informational signal is usable when this apparatus for processing informational signal is mounted to a predetermined position of a chassis and the apparatus for processing informational signal is unusable when this apparatus for processing informational signal is dismounted of the predetermined position of the chassis. Transmitting this state signal to another apparatus for processing informational signal allows another apparatus for processing informational signal to realize whether this apparatus for processing informational signal is usable or not.

The concluding portion of this specification particularly points out and directly claims the subject matter of the present invention. However, those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a block diagram for showing a configuration of an embodiment of an image-signal-processing system according to the invention;

FIG. 2 is a block diagram for showing a configuration of a signal-processing portion in a noise cancellation board;

FIG. 3A is an explanatory diagram of transmission data from a remote-control reception portion;

FIG. 3B is another explanatory diagram of the transmission data from the remote-control reception portion;

FIG. 3C is a further explanatory diagram of the transmission data from the remote-control reception portion;

FIG. 6A is an explanatory diagram of transmission data from an input board;

FIG. 6B is another explanatory diagram of the transmission data from the input board;

FIG. 6C is a further explanatory diagram of the transmission data from the input board;

FIG. 8 is an explanatory diagram of the transmission data from the format conversion board;

FIG. 9A is an explanatory diagram of operations when the noise cancellation board is unusable;

FIG. 9B is another explanatory diagram of operations when the noise cancellation board is unusable;

FIG. 9C is a further explanatory diagram of operations when the noise cancellation board is unusable;

FIG. 9D is a still further explanatory diagram of operations when the noise cancellation board is unusable;

DESCRIPTION OF THE PREFERRED EMBODIMENTS

Figure 4A:
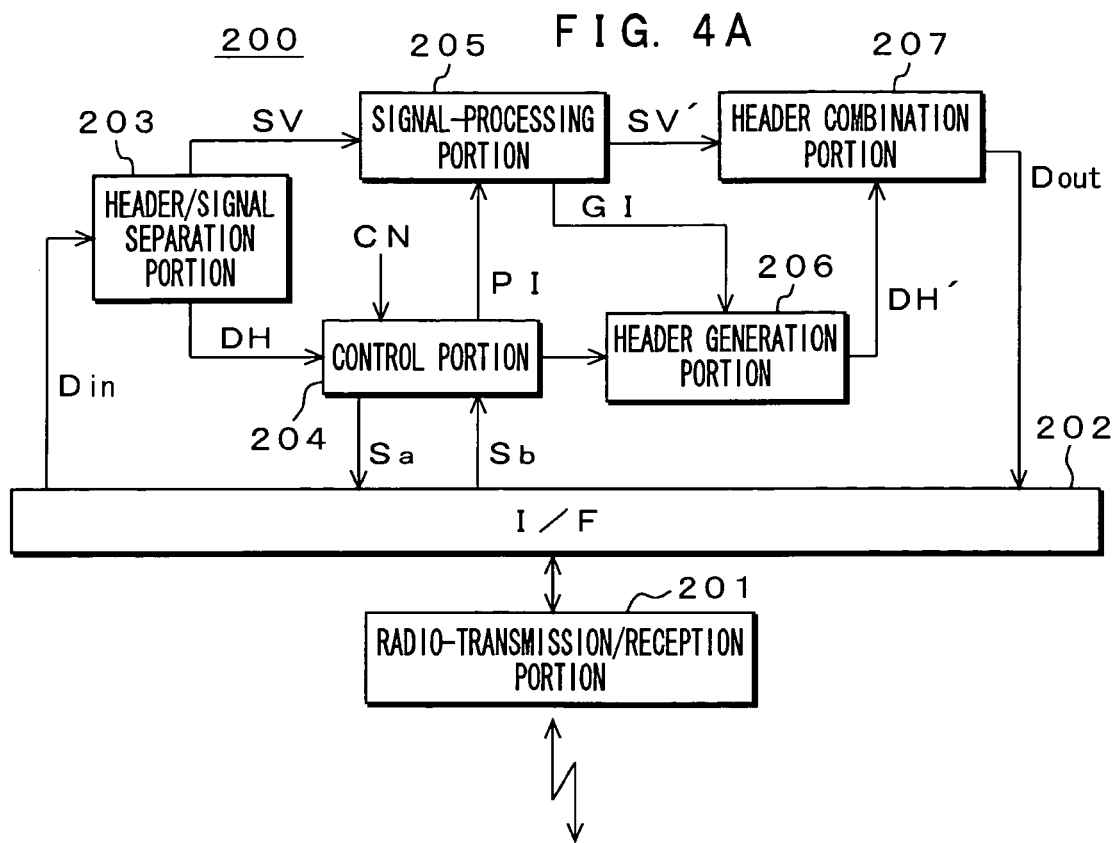
FIG. 4A is a block diagram for showing a circuit configuration of a processing board.

The following describe preferred embodiments of this invention with reference to the attached drawings. FIG. 1 shows a configuration of a preferred embodiment of an image-signal-processing system 100 according to the invention.

The processing system 100 has, as processing boards, an input board 101, a format conversion board 102, a noise cancellation board 103, an output board 104, and another output board 105.

The input board 101 is a processing board (apparatus for processing informational signal) for inputting an image signal $V_{in}$ to be processed. In the present embodiment, the image signal $V_{in}$, which is input to the input board 101, is supposed to be of, for example, a component scheme (hereinafter, referred to as "RGB scheme") for using red, green, and blue color signals or another component scheme (hereinafter referred to as "YCbCr scheme") for using luminosity, blue color difference, and red color difference signals. The format conversion board 102 and the noise cancellation board 103 handle image signals of the YCbCr scheme, so that the input board 101 converts the image signal $V_{in}$, if it is of the RGB scheme, into a signal of the YCbCr scheme.

Further, in the present embodiment, the image signal $V_{in}$, which is input to the input board 101, is supposed to be a standard definition (SD) signal or a high definition (HD) signal. Here, the SD signal is supposed to be, for example, a 480i signal and the HD signal, a 1080i signal or a 720p signal. It is to be noted that the 480i signal is an interlace-system signal having 480 valid scanning lines/frame. The 1080i signal is an interlace-system signal having 1080 valid scanning lines/frame. The 720p signal is a progressive-system signal having 720 valid scanning lines/frame.

The format conversion board 102 is a processing board (apparatus for processing informational signal) for performing format conversion on an image signal. This format conversion involves conversion of the number of scanning lines-and system conversion between the interlace system and the progressive system. If the input image signal $V_{in}$ and an output image signal are of the same format, this format conversion board 102 is not used. This format conversion board 102 is used when the input image signal $V_{in}$ is an SD signal (480i signal) and the output image signal is an HD signal (1080i signal or 720p signal) or vice versa and when the input image signal $V_{in}$ is an HD signal (1080i signal) and the output image signal is an HD signal (720p signal) or vice versa.

The noise cancellation board 103 is a processing board (apparatus for processing informational signal) for canceling noise from an image signal. If the image signal contains a little noise, this noise cancellation board 103 is not used. In the present embodiment, when this noise cancellation board 103 is used, its noise cancellation ability is adjusted in accordance with a quantity of noise contained in the image signal.

A signal-processing portion in the noise cancellation board 103 is of, for example, an infinite impulse response (IIR) filter configuration shown in FIG. 2. That is, this signal-processing portion is comprised of a coefficient unit 103a for multiplying an input by coefficient (1-α), another coefficient unit 103b for multiplying an output by coefficient a (0≦α23 1), an adder 103c for summing outputs of the coefficient units 103a and 103b, and a frame memory 103d for delaying an output of this adder 103c by a period of one frame to generate output. In this configuration, the larger the a value becomes, the higher the noise cancellation ability becomes, so that by varying the a value corresponding to the quantity of noise, the noise cancellation ability can be adjusted. It is to be noted that the larger the a value becomes, the more the resolution lowers.

The output board 104 is a processing board (apparatus for processing informational signal) for outputting an image signal $V_{out1}$, which is an HD signal, to a display 1. In the present embodiment, the output board 104 can output this image signal $V_{out1}$ in accordance with the RGB scheme or the YCbCr scheme. As described above, the format conversion board 102 and the noise cancellation board 103 handle an image signal of the YCbCr scheme, so that the output board 104 converts the YCbCr scheme into the RGB scheme to output the image signal $V_{out1}$ in accordance with the RGB scheme.

The output board 105 is a processing board (apparatus for processing informational signal) for outputting an image signal $V_{out2}$, which is an SD signal, to a display 2. In the present embodiment, the output board 105 can output this image signal $V_{out2}$ in accordance with the RGB scheme or the YCbCr scheme. As described above, the format conversion board 102 and the noise cancellation board 103 handle the image signal in accordance with the YCbCr scheme and the output board 105 converts the YCbCr scheme into the RGB scheme to output the image signal $V_{out2}$ in accordance with the RGB scheme.

Further, the processing system 100 has a remote-control transmitter 106 and a remote-control reception portion 107. The remote-control transmitter 106 outputs a remote-control signal RM based on a user operation. This remote-control signal RM is, for example, an infrared signal. In the present embodiment, the user can instruct the input board and the output boards, by operating the remote-control transmitter 106, to "input the image signal $V_{in}$ and output the image signal $V_{out1}$ or $V_{out2}$".

In this case, the user also inputs information about whether the image signal $V_{in}$ is an SD signal (480i signal) or an HD signal and, if it is an HD signal, whether it is a 1080i signal or a 720p signal as well as whether the image signal $V_{in}$ is of the RGB scheme or the YCbCr scheme. Also, in this case, the user inputs information about whether the image signals $V_{out1}$ and $V_{out2}$ are of the RGB scheme or the YCbCr scheme and, if the image signal $V_{out1}$ is to be output, whether it is a 1080i signal or a 720p signal.

The remote-control reception portion 107 receives the remote-control signal RM from the remote-control transmitter 106, generates transmission data D0 in accordance with an instruction included in it, and transmits it by radio to the side of the processing board. FIGS. 3A-3C show configurations of this transmission data D0 This transmission data D0 is constituted of consecutive header 1 as a first header and header 2 as a second header, as shown in FIG. 3A. As shown in FIGS. 3B and 3C, header 1 and header 2 are each constituted of a transmission destination ID (identification) region, a command region, and a control parameter region. In the transmission destination ID region, a board ID of a transmission destination board is described as transmission destination information. In the command region, a command for causing the transmission destination board to perform specific processing is described. In the control parameter region, information necessary to perform the processing in accordance with the command is described. A command and a control parameter described in the command region and the control parameter region respectively constitute processing information.

In the transmission destination ID region of the header 1, a board ID of the input board 101 is described. In the command region of the header 1, a command for "inputting SD signal" or "inputting HD signal" is described. In the control parameter region of the header 1, if the command instructs "inputting SD signal", whether the image signal $V_{in}$ is of the RGB scheme or the YCbCr scheme and whether the image signal $V_{in}$ is of 480i signal are described. If the command instructs "inputting HD signal", whether the image signal $V_{in}$ is of the RGB scheme or the YCbCr scheme and whether the image signal $V_{in}$ is of a 1080i signal or a 720p signal are described.

Similarly, in the transmission destination ID region of the header 2, a board ID of the output board 104 or that of the output board 105 is described. In the command region of the header 2, if the transmission destination ID is a board ID of the output board 104, a command for "outputting HD signal" is described and, if the transmission destination ID is a board ID of the output board 105, a command for "outputting SD signal" is described. In the control parameter region of the header 2, if the transmission destination ID is the board ID of the output board 104, whether the image signal $V_{out1}$ is of the RGB scheme or the YCbCr scheme and whether the image signal $V_{out1}$ is of a 1080i signal or a 720p signal are described. If the transmission destination ID is the board ID of the output board 105, whether the image signal $V_{out2}$ is of the RGB scheme or the YCbCr scheme and that the image signal $V_{out2}$ is of a 480i signal are described.

The following will describe a processing board (apparatus for processing informational signal) 200, which provides a basis for the input board 101, the format conversion board 102, the noise cancellation board 103, the output board 104, and the output board 105. FIG. 4 shows a configuration of the processing board 200.

This processing board 200 has radio-transmission/reception portion 201 and an interface 202. The transmission/reception portion 201 receives transmission data D0 transmitted by radio from the above-mentioned remote-control reception portion 107 and transmission data $D_{out}$ which is—transmitted by radio from any other processing board and transmits by radio transmission data $D_{out}$ generated by an internal circuit to any other processing board. The interface 202 performs processing for interface between the transmission/reception portion 201 and the internal circuit. In this configuration, the transmission/reception portion 201 constitutes data reception means and data transmission means.

Figure 5:
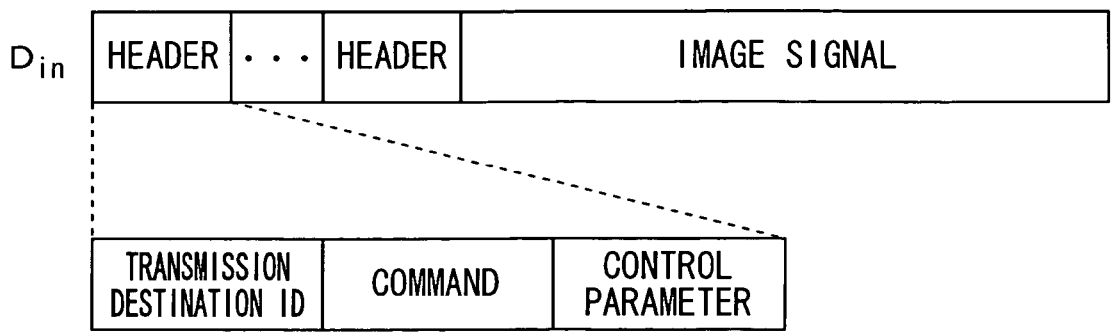
FIG. 5 is an explanatory diagram of a basic configuration of transmission data.

Further, the processing board 200 has a header/signal separation portion 203. This header/signal separation portion 203 separates transmission data $D_{in}$ (D0 or $D_{out}$) received by the transmission/reception portion 201 into a header DH and an image signal SV. FIG. 5 shows a basic configuration of the transmission data $D_{in}$, in which a predetermined number of headers are allocated at the-beginning, followed by the image signal. Each of the headers is comprised of a transmission destination ID region, a command region, and a control parameter region. Transmission data D0, which is transmitted from the above-mentioned remote-control reception portion 107, is comprised of only two headers (header 1 and header 2) (see FIG. 3A).

Further, the processing board 200 has a control portion 204. This control portion 204 decides whether the received transmission data $D_{in}$ is destined for the processing board itself, based on the header DH separated by the header/signal separation portion 203. In this case, the control portion 204 makes a decision based on whether a board ID described in the transmission destination ID region of the beginning header coincides with a board ID of the processing board.

Further, the control portion 204 controls the transmission/reception portion 201 via the interface 202 to transmit by radio a state signal Sa that indicates this state to any other processing board, when use of its own processing board 200 is enabled or disabled. When its own processing board 200 is mounted to a slot in a chassis, not shown, of the image-signal-processing system 100 so that it can be used, the control portion 204 is supplied with a signal CN from, for example, the side of the chassis. When supplied with this signal CN, the control portion 204 can recognize that it can be used. When its own processing board 200 is dismounted from the slot in the chassis so that it cannot be used, on the other hand, the control portion 204 is not supplied with the signal CN and can recognize that it cannot be used. In this case, the transmission/reception portion 201 constitutes signal transmission means.

Further, the processing board 200 has a signal-processing portion 205. This signal-processing portion 205 is comprised of a signal-processing-performing portion 205-11 (or 205-12) and an information acquisition portion 205-21 (or 205-22). If the control portion 204 decides that transmission data D$in$ is destined for its own processing board 200, the signal-processing-performing portion 205-11 (or 205-12) performs processing in this processing board 200 on an image signal separated by the header/signal separation portion 203 based on a command described in the command region of the beginning header and a control parameter described in the control parameter region, that is, processing information PI.

Further, the processing board 200 has a header generation portion 206. This header generation portion 206 generates a new header DH' to be combined with an image signal SV' after being processed by the signal-processing portion 205, basically based on processing information included in a header DH (which is not always the beginning header). In this case, the header generation portion 206 removes the beginning header from headers DH separated by the header/signal separation portion 203 and, if there is a header of the next transmission destination among these remaining headers, defines it as a new header DH' and, otherwise, generates a header of the next transmission destination and allocates it at the beginning of the remaining headers to define it as a new header DH'.

When the information acquisition portion 205-21 (205-22) in the above-mentioned signal-processing portion 205 acquires information GI that indicates a state of the processed image signal SV', this information GI is supplied to the header generation portion 206. Further, when the transmission/reception portion 201 receives a state signal Sb, transmitted from any other processing board, the state signal Sb indicating a usable state or an unusable state, this state signal Sb is supplied to the header generation portion 206 via the interface 202 and the control portion 204. In this case, the transmission/reception portion 201 constitutes signal reception means.

The header generation portion 206, as described above, determines a transmission destination of the image signal SV' after being processed by the signal-processing portion 205, basically based on information included in a header DH separated by the header/signal separation portion 203. However, as described above, if supplied with the information GI that indicates the state of the image signal SV' and the state signal Sb related to any other processing board, based on these, it determines a transmission destination of the image signal SV', that is, a board ID of a transmission destination board described in the transmission destination ID region in the beginning head of the headers DH'.

Further, the processing board 200 has a header combination portion 207. This header combination portion 207 combines a new header DH' generated by the processing in the header generation portion 206 with the beginning of the image signal SV' acquired after being processed by the signal-processing portion 205, to form transmission data $D_{out}$ to be transmitted. This transmission data $D_{out}$ is supplied via the interface 202 to the transmission/reception portion 201, to be transmitted by radio to the other processing boards.

The following will describe operations of the processing board 200 shown in FIG. 4A. When the transmission/reception portion 201 receives transmission data $D_{in}$ (D0 or $D_{out}$), this transmission data $D_{in}$ is supplied from the transmission/reception portion 201 via the interface 202 to the header/signal separation portion 203. This header/signal separation portion 203 separates a header DH and an image signal SV from the transmission data $D_{in}$. The image signal SV is supplied to the signal-processing portion 205 and the header DH, to the control portion 204.

The control portion 204 decides whether the received transmission data Din is destined for itself, based on a board ID described in the transmission destination ID region in the beginning header of the headers DH. In this case, if the board ID described in the transmission destination ID region coincides with a board ID of the processing board, it decides that the received transmission data $D_{in}$ is destined for the processing board itself.

If it decides that the received transmission data $D_{in}$ is destined for the processing board itself, the signal-processing portion 205 processes the image signal SV based on a command and a control parameter included in the beginning header, that is, processing information PI. An image signal SV' obtained by the processing in this signal-processing portion 205 is supplied to the header combination portion 207.

In the header generation portion 206, under the control of the control portion 204, a new header DH' to be combined with the processed image signal SV' is generated, based on information included in the header DH (which is not always the beginning header). In this case, the beginning header is removed from the headers DH separated by the header/signal separation portion 203 and, if there is a header of the next transmission destination among these remaining headers, it is defined as a new header DH' and, otherwise, a header of the next transmission destination is generated and allocated at the beginning of the remaining headers and defined as a new header DH'.

When the signal-processing portion 205 acquires information GI that indicates a state of the processed image signal SV', this information GI is supplied to the header generation portion 206. Further, when the transmission/reception portion 201 receives a state signal Sb, transmitted from any other processing board, that indicates a usable state or an unusable state, this state signal Sb is supplied via the interface 202 and the control portion 204 to the header generation portion 206.

Basically, the header generation portion 206 determines a transmission destination of the image signal SV' generated by the processing in the signal-processing portion 205, based on processing information included in a header DH separated by the header/signal separation portion 203. However, as described above, if supplied with information GI that indicates a state of the image signal SV' and the state signal Sb related to any other processing board, it determines the transmission destination of the image signal SV' based on these also.

A new header DH' generated by the header generation portion 206 is supplied to the header combination portion 207. This header combination portion 207 combines the new header DH' generated by the header generation portion 206 with the beginning of the image signal SV' obtained by the processing in the signal-processing portion 205, to form transmission data $D_{out}$ to be transmitted. This transmission data $D_{out}$ is supplied via the interface 202 to the transmission/reception portion 201, to be transmitted by radio to other processing boards.

Further, when its own processing board 200 is mounted to the slot in the chassis, not shown, of the image-signal-processing system 100 so that it can be used, the control portion 204 is supplied with the signal CN from, for example, the side of the chassis. When the processing board 200 is dismounted from the slot in the chassis so that it cannot be used, on the other hand, the control portion 204 is not supplied with the signal CN. When use of its own processing board 200 is enabled or disabled, the state signal Sa that indicates this state is transmitted by radio from the control portion 204 to other processing boards via the interface 202 and the transmission/reception portion 201.

As described above, the processing board 200 shown in FIG. 4A provides a basis for the input board 101, the format conversion board 102, the noise cancellation board 103, the output board 104, and the output board 105. These processing boards are each subject to modification in basic configuration in accordance with a type of processing to be performed. The following will describe each of the boards.

First, the input board 101 will be described. The input board 101 has roughly the same configuration as the processing board 200 has. However, the transmission data D*in* received by this input board 101 constitutes transmission data D0 to be transmitted from the remote-control reception portion 107 and is comprised of only headers DH (header 1 and header 2) (see FIG. 3A). For this reason, the image signal SV is not separated by the header/signal separation portion 203, so that the image signal $V_{in}$ is directly input to the signal-processing portion 205. The signal-processing portion 205 takes in the image signal $V_{in}$ and, if this image signal $V_{in}$ is of the RGB scheme, converts it into a signal of the YCbCr scheme, to obtain an image signal SV'.

Figure 4B:
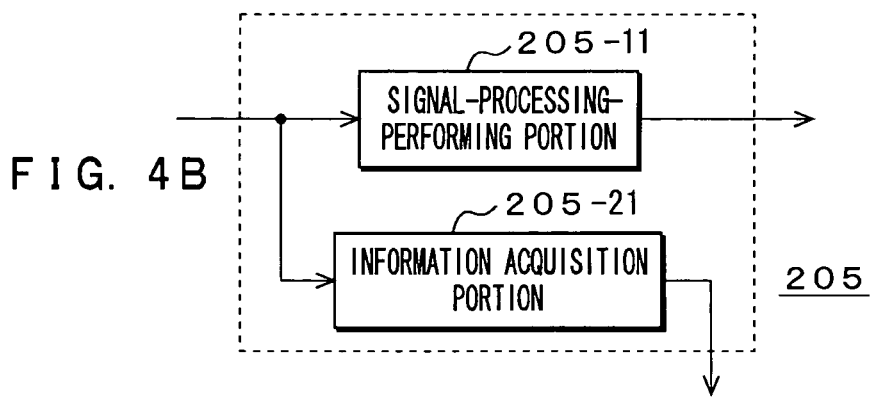
FIG. 4B is a block diagram for showing one circuit configuration of the signal-processing portion that constitutes the processing board.
Figure 4C:
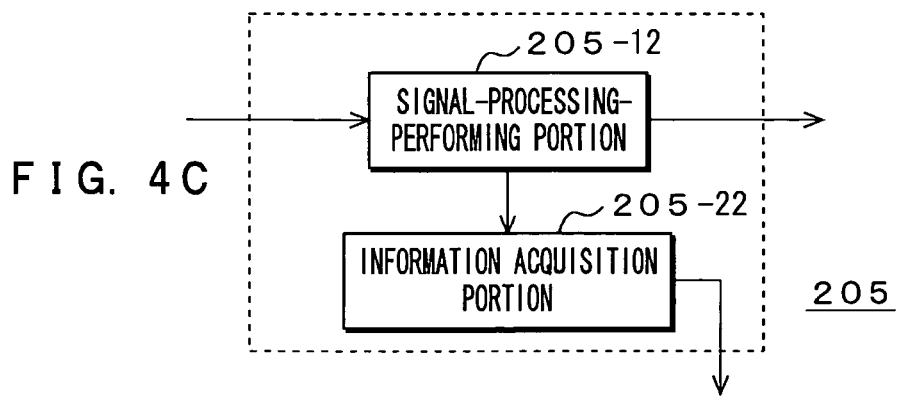
FIG. 4C is a block diagram for showing another circuit configuration of the signal-processing portion that constitutes the processing board.

Further, in the case of the input board 101, the signal-processing portion 205 acquires noise quantity information that indicates an amount of noise contained in the image signal SV', as information GI indicating a state of the image signal SV'. That is, this signal-processing portion 205 constitutes not only signal-processing means but also information acquisition means. For example, when to the image signal $V_{in}$ to be input to the signal-processing portion 205, the noise quantity information is added beforehand, the signal-processing portion 205 extracts from the image signal $V_{in}$ that noise quantity information, as shown in FIG. 4B. It is to be noted that this noise quantity information may not only thus be added beforehand to the image signal $V_{in}$ to be input but also be obtained on the basis of a time-directional change of the image signal SV' or, if the image signal is received, based on an intensity of an electric field at a site of reception. In such a case, as shown in FIG. 4C, the information GI that indicates the state can be acquired by the information acquisition portion 205-22 from the image signal after being processed by the signal-processing-performing portion 205-12.

Further, in the case of the input board 101, the noise cancellation board 103 is determined as a transmission destination processing board if the header generation portion 206 decides that the quantity of noise contained in the image signal SV' is large from the noise quantity information based on the information GI supplied from the signal-processing portion 205 and that the noise cancellation board 103 is usable from the informational signal Sb.

On the other hand, if the quantity of noise contained in the image signal SV' is decided to be large but the noise cancellation board 103 is decided to be unusable from the informational signal Sb or if the quantity of noise contained in the image signal SV' after being processed is decided to be small from the noise quantity information, the transmission destination processing board is determined on the basis of information of the header DH. That is, from the information of headers 1 and 2, if a format of the input image signal $V_{in}$ is decided to be different from that of an image signal to be output finally, the transmission destination processing board is determined to be the format conversion board 102 and, if it is decided that the format of the image signal $V_{in}$ is the same as that of the finally output image signal, the transmission destination processing board is determined to be the output board 104 or the output board 105, from the information of header 2.

FIGS. 6A, 6B, and 6C show configurations of transmission data $D_{out}$ to be transmitted from the input board 101. FIG. 6A shows the transmission data $D_{out}$ in a case where a transmission destination is the noise cancellation board. This transmission data $D_{out}$ has such a configuration that headers 3 and 2 are allocated first, followed by an image signal. The header 2 is the same as the header 2 in transmission data D0 that is transmitted from the above-mentioned remote-control reception portion 107 (see FIG. 3C). This holds true also with the following FIGS. 6B and 6C.

In a transmission destination ID region of header 3, a board ID of the noise cancellation board 103 is described. In a command region of the header 3, a command to "cancel noise" is described. In a control parameter region of the header 3, noise quantity information and a format of the input image signal $V_{in}$ are described. The noise quantity information is used to adjust a noise cancellation ability by the signal-processing portion in the noise cancellation board 103. The format of the input image signal $V_{in}$ is necessary for the header generation portion 206 in the noise cancellation board 103 to determine a transmission destination. In this case, the header generation portion 206 removes header 1 from header 1 and header 2 that constitute a header DH and, in place of that, generates header 3, which is combined with the remaining header 2 to form a new header DH'.

FIG. 6B shows the transmission data $D_{out}$ in a case where the transmission destination is the format conversion board 102. This transmission data $D_{out}$ has such a configuration that header 4 and header 2 are allocated first, followed by an image signal. In the transmission destination ID region of the header 4, a board ID of the format conversion board 102 is described. In a command region of the header 4, a command to "convert format" is described. In a control parameter region of the header 4, a conversion manner such as from SD signal to HD signal or vice versa or from HD signal (1080i signal) to HD signal (720p signal) or vice versa is described. In this case, the header generation portion 206 removes header 1 from header 1 and header 2 that constitute a header DH and, in place of that, generates the header 4, which is combined with the remaining header 2 to form a new header DH'.

FIG. 6C shows the transmission data $D_{out}$ in a case where the transmission destination is the output board 104 or 105. This transmission data $D_{out}$ has such a configuration that header 2 is allocated first, followed by an image signal. In this case, the header generation portion 206 removes header 1 from header 1 and header 2 that constitute a header DH and defines the remaining header 2 as a new header DH'.

The following will describe the noise cancellation board 103. The noise cancellation board 103 has a configuration similar to that of the processing board 200. The signal-processing portion 205 performs processing to cancel noise of the image signal SV. In this case, the signal-processing portion 205 has a configuration of, for example, the IIR filter shown in the above-described FIG. 2. In this signal-processing portion 205, the value of α is changed on the basis of noise quantity information serving as the processing information PI, to adjust the noise cancellation ability.

In the noise cancellation board 103, the signal-processing portion 205 does not acquire information GI that indicates a state of the image signal SV'. The header generation portion 206 determines a transmission destination based on information included in a header DH, not taking into account the information GI and the state signal Sb. That is, if the format of the input image signal $V_{in}$ is decided to be different from that of an image signal to be output finally, the transmission destination processing board is determined to be the format conversion board 102 and, if the format of the input image signal $V_{in}$ is decided to be the same as that of an image signal to be output finally, it is determined to be the output board 104 or 105 based on the information of header 2.

Figure 7A:
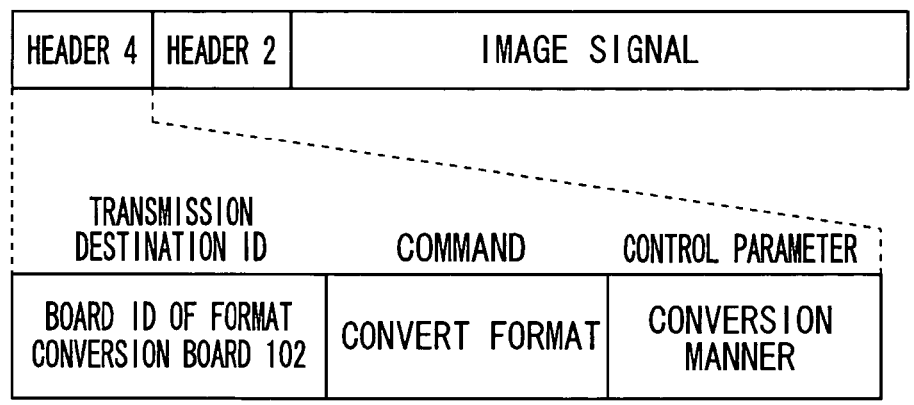
FIG. 7A is an explanatory diagram of transmission data from a noise cancellation board.
Figure 7B:
FIG. 7B is another explanatory diagram of the transmission data from the noise cancellation board.

FIGS. 7A and 7B show configurations of transmission data $D_{out}$ to be transmitted from the noise cancellation board 103. FIG. 7A shows the transmission data $D_{out}$ in a case where a transmission destination is the format conversion board 102. This transmission data $D_{out}$ has such a configuration that headers 4 and 2 are allocated first, followed by an image signal. The header 2 is the same as the header 2 in transmission data D0 that is transmitted from the above-mentioned remote-control reception portion 107 (see FIG. 3C) This holds true also with the following FIG. 7B.

In a transmission destination ID region of the header 4, a board ID of the format conversion board 102 is described. In a command region of the header 4, a command to "convert format" is described. In a control parameter region of the header 4, a conversion manner such as a conversion from SD signal to HD signal or vice versa or a conversion from HD signal (1080i signal) to HD signal (720p signal) or vice versa is described. In this case, the header generation portion 206 removes header 3 from header 3 and header 2 that constitute a header DH and, in place of that, generates header 4, which is combined with the remaining header 2 to form a new header DH'.

FIG. 7B shows the transmission data $D_{out}$ in a case where the transmission destination is the output board 104 or 105. This transmission data $D_{out}$ has such a configuration that header 2 is allocated first, followed by an image signal. In this case, the header generation portion 206 removes header 3 from header 3 and header 2 that constitute a header DH and defines the remaining header 2 as a new header DH'.

The following will describe the format conversion board 102. The format conversion board 102 has a configuration similar to that of the processing board 200. The signal-processing portion 205 performs processing to convert a format of the image signal SV. In this format conversion board 102, the signal-processing portion 205 does not acquire information GI that indicates a state of the image signal SV'. The header generation portion 206 determines a transmission destination based on information included in a header DH, not taking into account the information GI and the state signal Sb. That is, the transmission destination processing board is determined to be the output board 104 or 105 from information of header 2.

FIG. 8 shows the transmission data $D_{out}$, which is transmitted from the format conversion board 102. This transmission data $D_{out}$ has such a configuration that header 2 is allocated first, followed by an image signal. In this case, the header generation portion 206 removes header 4 from header 4 and header 2 that constitute a header DH and defines the remaining header 2 as a new header DH'.

The following will describe the output boards 104 and 105. The output boards 104 and 105 each have roughly the same configuration as that of the processing board 200 except that they have no processing system for transmitting transmission data to any other processing board. That is, the output boards 104 and 105 do not have the header generation portion 206 nor the header combination portion 207, so that the image signal SV' after being processed by the signal-processing portion 205 is output as an image signal $V_{out}$, or $V_{out2}$. The signal-processing portion 205 performs processing to output the image signal SV separated by the header/signal separation portion 203 as the image signal $V_{out1}$ or $V_{out2}$ and, if it is of the RGB scheme, processing to convert the YCbCr scheme into the RGB scheme.

The following will describe an operation example of the image-signal-processing system 100 shown in FIG. 1. In this operation example, the image signal $V_{in}$ to be input to the input board 101 is an SD signal (480i signal) and an HD signal (1080i signal) is output from the output board 104. Further, in this example, the noise cancellation board 103 is supposed to be unusable.

First, in response to a user's operation on the remote-control transmitter 106, transmission data D0 is transmitted from the remote-control reception portion 107 to the side of the processing boards. This transmission data D0 has a configuration in which header 1 and header 2 are allocated consecutively (see FIGS. 9A and 3A-3C). In header 1, processing information (command and control parameter) in the input board 101 is described and, as its transmission destination ID, a board ID of the input board 101 is described. In header 2, processing information in the output board 104 is described and, as its transmission destination ID, a board ID of the output board 104 is described.

The transmission data D0 transmitted by radio from the remote-control reception portion 107 is received by the various processing boards. In each of these processing boards, the header/signal separation portion 203 separates headers DH from the transmission data D0 ($D_{in}$), so that the control portion 204 decides whether the transmission data D0 is destined for the processing board itself based on whether a board ID described in the transmission destination ID region of the header 1, which is the beginning header, of these headers DH coincides with a board ID of the processing board or not.

As described above, since the header 1 has a board ID of the input board 101 described in it as the transmission destination ID, the control portion 204 in the input board 101 decides that the transmission data D0 is destined for the input board itself. The other processing boards, on the other hand, each decide that the transmission data D0 is not destined for the processing boards themselves and do not perform processing that is based on the processing information included in the header 1.

In the input board 101, based on processing information PI included in the header 1, its signal-processing portion 205 performs processing to take in the image signal $V_{in}$ and, if the image signal $V_{in}$ is of the RGB scheme, the signal-processing portion 205 also performs processing to convert the image signal $V_{in}$ of the RGB scheme into that of the YCbCr scheme, thus obtaining an image signal SV'. Further, in this input board 101, its signal-processing portion 205 acquires noise quantity information added to the image signal $V_{in}$, as information GI that indicates a state of the image signal SV'.

The header generation portion 206 in the input board 101 generates a new header DH' to be combined with the image signal SV'. At this header generation portion 206, the noise cancellation board 103 is unusable and information of the header DH indicates that a format of the input image signal $V_{in}$ is different from that of the output image signal $V_{out1}$, so that the transmission destination processing board is determined to be the format conversion board 102. This header generation portion 206 generates header 4 in which processing information (command and control parameter) about the form at conversion board 102 is described and also, as the transmission destination ID, a board ID of the format conversion board 102 is described. These headers 4 and 2 are combined to form a new header DH'.

The input board 101 combines the new header DH' generated by the header generation portion 206 with the beginning of the image signal SV' obtained by the processing in the signal-processing portion 205, to generate transmission data $D_{out}$ to be transmitted (see FIGS. 9B and 6B). This transmission data $D_{out}$ is transmitted by radio from the input board 101 to other processing boards.

In such a manner, the transmission data $D_{out}$ transmitted from the input board 101 is received by each of the processing boards. In each of these processing boards, the header/signal separation portion 203 separates the headers DH from the transmission data $D_{out}$ ($D_{in}$), so that the control portion 204 decides whether the transmission data $D_{out}$ is destined for the processing board itself based on whether a board ID described in the transmission destination ID region of header 4, which is the beginning header of the headers DH, coincides with a board ID of the processing board.

As described above, in the header 4 the board ID of the format conversion board 102 is described as the transmission destination ID, so that the control portion 204 in the format conversion board 102 decides that the transmission data $D_{out}$ is destined for the format conversion board itself. The other processing boards, on the other hand, each decide that the transmission data $D_{out}$ is not destined for the processing boards themselves and do not perform processing that is based on the processing information included in the header 4.

In the format conversion board 102, the signal-processing portion 205 converts an SD signal (480i signal), which is the image signal SV separated by the header/signal separation portion 203, into an HD signal (1080i signal) based on the processing information PI included in the header 4, thereby obtaining an image signal SV'.

The header generation portion 206 in the format conversion board 102 generates a new header DH' to be combined with the image signal SV'. At this header generation portion 206, the information of the header DH indicates that the image signal $V_{out1}$, which is an HD signal (1080i signal), be output finally, so that the transmission destination processing board is determined to be the output board 104. This header generation portion 206 removes header 4 from those headers 4 and 2 that constitute the header DH and defines the remaining header 2 as a new header DH'.

In the format conversion board 102, the new header DH' generated by the header generation portion 206 is combined with the beginning of the image signal SV' obtained by the processing in the signal-processing portion 205, to form transmission data $D_{out}$ to be transmitted (see FIGS. 9C and 8). This transmission data $D_{out}$ is transmitted by radio from the format conversion board 102 to other processing boards.

In such a manner, the transmission data $D_{out}$ transmitted from the format conversion board 102 is received by each of the processing boards. In each of these processing boards, its header/signal separation portion 203 separates the headers DH from the transmission data $D_{out}$ ($D_{in}$), so that its control portion 204 decides whether the transmission data $D_{out}$ is destined for the processing board itself based on whether a board ID described in the transmission destination ID region of header 2, which is the beginning header of the headers DH, coincides with a board ID of the processing board.

As described above, in the header 2 the board ID of the output board 104 is described as the transmission destination ID, so that the control portion 204 in the output board 104 decides that the transmission data $D_{out}$ is destined for the output board itself. The other processing boards, on the other hand, each decide that the transmission data $D_{out}$ is not destined for the processing boards themselves and do not perform processing that is based on the processing information included in the header 2.

In the output board 104, the signal-processing portion 205 performs processing to output the image signal SV separated by the header/signal separation portion 203 as the image signal $V_{out}$, based on the processing information PI included in the header 2 (see FIG. 9D). In this case, if the image signal $V_{out1}$ is of the RGB scheme, it performs processing to convert the YCbCr scheme into the RGB scheme also.

Again, the following will describe another operation example of the image-signal-processing system 100 shown in FIG. 1. In this operation example, the image signal $V_{in}$ to be input to the input board 101 is an SD signal (480i signal) and an HD signal (1080i signal) is output from the output board 104. Further, in this example, it is supposed that the noise cancellation board 103 is usable and noise quantity information acquired by the signal-processing portion 205 in the input board 101 indicates that a quantity of noise contained in the image signal SV' is large.

First, in response to a user's operation on the remote-control transmitter 106, transmission data D0 is transmitted from the remote-control reception portion 107 to the side of the processing boards. This transmission data D0 has a configuration in which header 1 and header 2 are allocated consecutively (see FIGS. 10A and 3A-3C). In the header 1, processing information (command and control parameter) in the input board 101 is described and, as its transmission destination ID, a board ID of the input board 101 is described. In the header 2, processing information in the output board 104 is described and, as its transmission destination ID, a board ID of the output board 104 is described.

The transmission data D0 transmitted by radio from the remote-control reception portion 107 is received by each of the processing boards. In each of these processing boards, its header/signal separation portion 203 separates headers DH from the transmission data D0 ($D_{in}$), so that its control portion 204 decides whether the transmission data D0 is destined for the processing board itself based on whether a board ID described in the transmission destination ID region of header 1, which is the beginning header of these headers DH, coincides with a board ID of the processing board or not.

As described above, since in the header 1 the board ID of the input board 101 is described as the transmission destination ID, the control portion 204 in the input board 101 decides that the transmission data D0 is destined for the input board itself. The other processing boards, on the other hand, each decide that the transmission data D0 is not destined for the processing boards themselves and do not perform processing that is based on processing information included in the header 1.

In the input board 101, based on processing information PI included in the header 1, the signal-processing portion 205 performs processing to take in the image signal $V_{in}$ and, if the image signal $V_{in}$ is of the RGB scheme, the signal-processing portion 205 also performs processing to convert the image signal $V_{in}$ of the RGB scheme into that of the YCbCr scheme, thus obtaining an image signal SV'. Further, in this input board 101, the signal-processing portion 205 acquires noise quantity information added to the image signal $V_{in}$, as information GI that indicates a state of the image signal SV'.

The header generation portion 206 in the input board 101 generates a new header DH' to be combined with the image signal SV'. At this header generation portion 206, the noise cancellation board 103 is usable and the quantity of noise contained in the image signal SV' is decided to be large based on the noise quantity information, so that the transmission destination processing board is determined to be the noise cancellation board 103. This header generation portion 206 generates header 3 in which processing information (command and control parameter) about the noise cancellation board 103 is described and, as the transmission destination ID, a board ID of the noise cancellation board 103 is described. These headers 3 and 2 are combined to form a new header DH'.

Figure 10A:
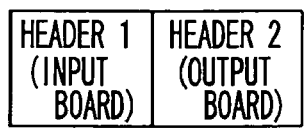
FIG. 10A is an explanatory diagram of operations when the noise cancellation board is usable.
Figure 10B:
FIG. 10B is another explanatory diagram of operations when the noise cancellation board is usable.

The input board 101 combines the new header DH' generated by the header generation portion 206 with the beginning of the image signal SV' obtained by the processing in the signal-processing portion 205, to generate transmission data $D_{out}$ to be transmitted (see FIGS. 10B and 6A). This transmission data $D_{out}$ is transmitted by radio from the input board 101 to other processing boards.

In such a manner, the transmission data $D_{out}$ transmitted from the input board 101 is received by each of the processing boards. In each of these processing boards, its header/signal separation portion 203 separates the headers DH from the transmission data $D_{out}$ ($D_{in}$), so that its control portion 204 decides whether the transmission data $D_{out}$ is destined for the processing board itself based on whether a board ID described in the transmission destination ID region of the header 3, which is the beginning header of the headers DH, coincides with a board ID of the processing board.

As described above, the board ID of the noise cancellation board 103 is described as the transmission destination ID in the header 3, so that the control portion 204 in the noise cancellation board 103 decides that the transmission data $D_{out}$ is destined for the noise cancellation board itself. The other processing boards, on the other hand, each decide that the transmission data $D_{out}$ is not destined for the processing boards themselves and do not perform processing that is based on the processing information included in the header 3.

In the noise cancellation board 103, based on processing information PI included in the header 3, its signal-processing portion 205 cancels noise from the image signal SV separated by the header/signal separation portion 203, thereby obtaining an image signal SV'. The header generation portion 206 in the noise cancellation board 103 generates a new header DH' to be combined with the image signal SV'. At this header generation portion 206, information of the header DH indicates that a format of the input image signal $V_{in}$ is different from that of the output image signal $V_{out}1$, so that the transmission destination processing board is determined to be the format conversion board 102. This header generation portion 206 generates header 4 in which processing information (command and control parameter) about the format conversion board 102 is described and, as the transmission destination ID, a board ID of the format conversion board 102 is described. Those headers 4 and 2 are combined to form a new header DH'.

Figure 10C:
FIG. 10C is a further explanatory diagram of operations when the noise cancellation board is usable.

The noise cancellation board 103 combines the new header DH' generated by the header generation portion 206 with the beginning of the image signal SV' obtained by the processing in the signal-processing portion 205, to generate transmission data $D_{out}$ to be transmitted (see FIGS. 10C and 7A). This transmission data $D_{out}$ is transmitted by radio from the noise cancellation board 103 to other processing boards.

In such a manner, the transmission data $D_{out}$ transmitted from the noise cancellation board 103 is received by each of the processing boards. In each of these processing boards, the header/signal separation portion 203 separates the headers DH from the transmission data $D_{out}$ ($D_{in}$), so that the control portion 204 decides whether the transmission data $D_{out}$ is destined for the noise cancellation board itself based on whether a board ID described in the transmission destination ID region of header 4, which is the beginning header of the headers DH, coincides with a board ID of the processing board.

As described above, in the header 4 the board ID of the format conversion board 102 is described as the transmission destination ID, so that the control portion 204 in the format conversion board 102 decides that the transmission data $D_{out}$ is destined for the format conversion board itself. The other processing boards, on the other hand, each decide that the transmission data $D_{out}$ is not destined for the processing boards themselves and do not perform processing that is based on the processing information included in the header 4.

In the format conversion board 102, its signal-processing portion 205 converts an SD signal (480i signal), which is the image signal SV separated by the header/signal separation portion 203, into an HD signal (1080i signal) based on the processing information PI included in the header 4, thereby obtaining an image signal SV'.

The header generation portion 206 in the format conversion board 102 generates a new header DH' to be combined with the image signal SV'. At this header generation portion 206, the information of the header DH indicates that the image signal $V_{out1}$, which is an HD signal (1080i signal), be output finally, so that the transmission destination processing board is determined to be the output board 104. This header generation portion 206 removes header 4 from those headers 4 and 2 that constitute the header DH and defines the remaining header 2 as a new header DH'.

Figure 10D:
FIG. 10D is a still further explanatory diagram of operations when the noise cancellation board is usable.

In the format conversion board 102, the new header DH' generated by the header generation portion 206 is combined with the beginning of the image signal SV' obtained by the processing in the signal-processing portion 205, to generate transmission data $D_{out}$ to be transmitted (see FIGS. 10D and 8). This transmission data $D_{out}$ is transmitted by radio from the format conversion board 102 to other processing boards.

In such a manner, the transmission data $D_{out}$ transmitted from the format conversion board 102 is received by each of the processing boards. In each of these processing boards, the header/signal separation portion 203 separates the headers DH from the transmission data $D_{out}$ ($D_{in}$), so that the control portion 204 decides whether the transmission data $D_{out}$ is destined for the processing board itself based on whether a board ID described in the transmission destination ID region of header 2, which is the beginning header of the headers DH, coincides with a board ID of the processing board.

As described above, in header 2 the board ID of the output board 104 is described as the transmission destination ID, so that the control portion 204 in the output board 104 decides that the transmission data $D_{out}$ is destined for the output board itself. The other processing boards, on the other hand, each decide that the transmission data $D_{out}$ is not destined for the processing boards themselves and do not perform processing that is based on the processing information included in the header 2.

Figure 10E:
FIG. 10E is an additional explanatory diagram of operations when the noise cancellation board is usable.

In the output board 104, the signal-processing portion 205 performs processing to output the image signal SV separated by the header/signal separation portion 203 as the image signal $V_{out}$ based on the processing information PI included in the header 2 (see FIG. 10E). In this case, if the image signal $V_{out1}$ is of the RGB scheme, it performs processing to convert the image signal $V_{out1}$ of YCbCr scheme into that of RGB scheme also.

In the above-described embodiments, the processing boards (the input board 101, the format conversion board 102, and the noise cancellation board 103) each have basically determined a transmission destination by themselves based on the processing information included in each of the headers of transmission data D0 and $D_{out}$. This avoids a control of the transmission destination by the controller. Therefore, if a format of the image signal $V_{in}$ which is input to the input board 101 or that of an image signal which is output to a display is changed, it is necessary only to change the processing information (command and control parameter) of the headers 1 and 2 that constitute transmission data D0, which is output from the remote-control reception portion 107, thus enabling an order in which image signals are processed to be easily set. Further, since the controller is not necessary, it is possible to reduce a scale of circuits of the image-signal-processing system 100.

Further, in the above-described embodiments, the processing board 200 has acquired information GI that indicates a state of the image signal SV' obtained by the processing in the signal-processing portion 205 and, based on information included in headers DH separated by the header/signal separation portion 203 and the information GI acquired by the signal-processing portion 205, the header generation portion 206 has determined a transmission destination processing board. For example, the input board 101 can acquire noise quantity information as the information GI that indicates the state of the processed image signal SV' and, based on that noise quantity information and the information included in the headers DH separated by the header/signal separation portion 203, the header generation portion 206 can determine a transmission destination processing board. Therefore, the input board 101 can determine the transmission destination in accordance with a quantity of noise contained in the image signal SV', so that when the noise quantity is small, it is possible to eliminate, for example, useless noise cancellation processing to be performed by the noise cancellation board 103 and to prevent deterioration in image quality owing to it.

Further, in the above-described embodiments, the processing board 200 has received the state signal Sb, transmitted from any other processing boards, that indicates whether they are usable or not, while the header generation portion 206 has determined a transmission destination processing board based on the received state signal Sb and the processing information included in headers DH separated by the header/signal separation portion 203. That is, the header generation portion 206 in the processing board can change a transmission destination automatically in response to whether any other processing boards are usable, thus enabling each of the processing boards to be easily mounted and dismounted.

For example, the header generation portion 206 in the input board 101 can know whether the noise cancellation board 103 is usable from the state signal Sb received from the noise cancellation board 103, thereby immediately changing a transmission destination processing board. That is, in a case where the quantity of noise contained in the processed image signal SV' is large, if the noise cancellation board 103 is mounted to the slot in the chassis so that it can be used, the header generation portion 206 immediately changes the transmission destination processing board to the noise cancellation board 103. If the noise cancellation board 103 is dismounted from the slot in the chassis so that it cannot be used, on the other hand, the header generation portion 206 immediately changes the transmission destination processing board to the format conversion board 102.

Further, in the above-described embodiments, the processing board 200 transmits by radio to other processing boards the state signal Sa that indicates either a state that its own processing board is mounted to, for example, the slot in the chassis so that it can be used or a state that its own processing board is dismounted from, for example, the slot in the chassis so that it cannot be used. This allows any other processing boards to be easily notified.

Figure 11:
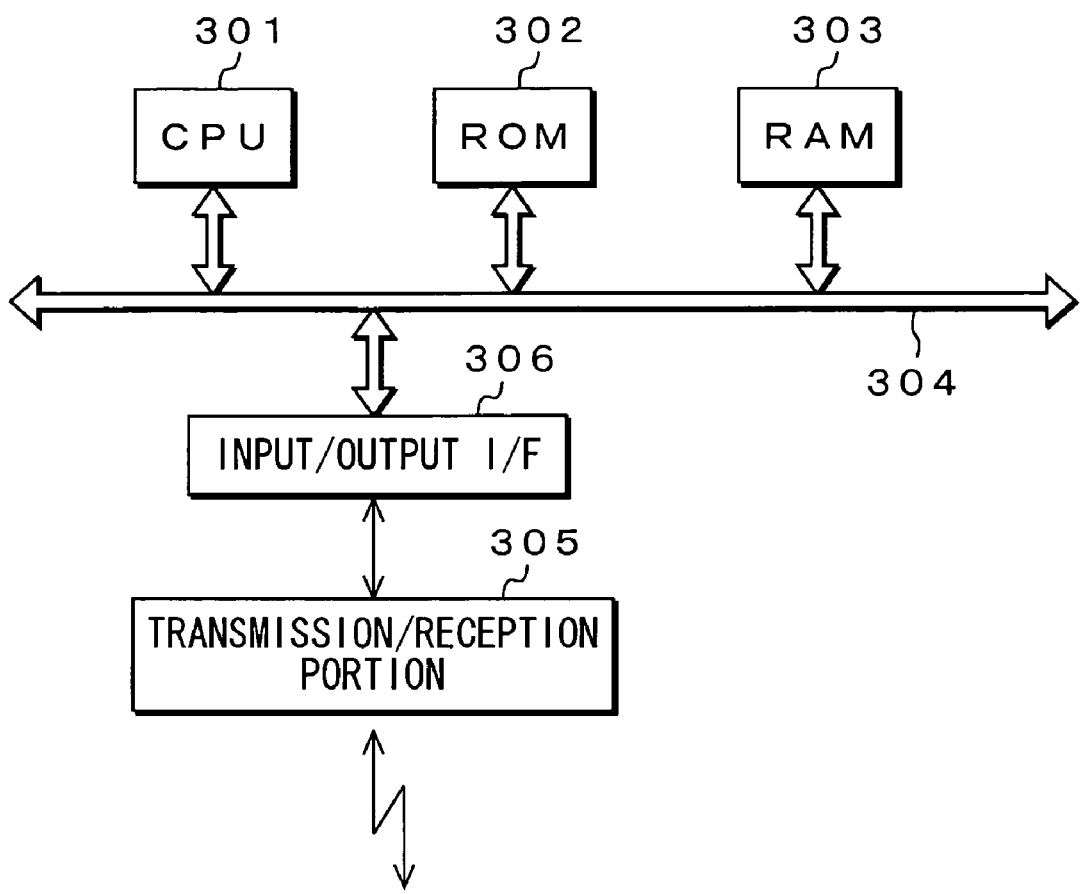
FIG. 11 is a block diagram for showing a configuration of an apparatus for processing image signal that realizes processing in the processing board by software.

It is to be noted that the processing in the processing board 200 shown in FIG. 4 can be realized in software by using, for example, an apparatus 300 for processing image signal shown in FIG. 11.

This apparatus 300 for processing image signal has a central processing unit (CPU) 301, which is a computer for controlling operations of the device as a whole, a read only memory (ROM) 302 in which operation programs etc. of this CPU301 are stored, and a random access memory (RAM) 303 that provides a work space for the CPU301. These CPU301, ROM302, and RAM303 are respectively connected to a bus 304. Further, the apparatus 300 for processing image signal has a transmission/reception portion 305 for communication with the remote-control reception portion 107 and any other processing boards. This transmission/reception portion 305 is connected through an input/output interface 306 to the bus 304. It is to be noted that the ROM302 can be replaced by a detachable memory card etc. in which the operation programs etc. are stored, thus accommodating the processing board 200 that performs a variety of processing items.

Figure 12:
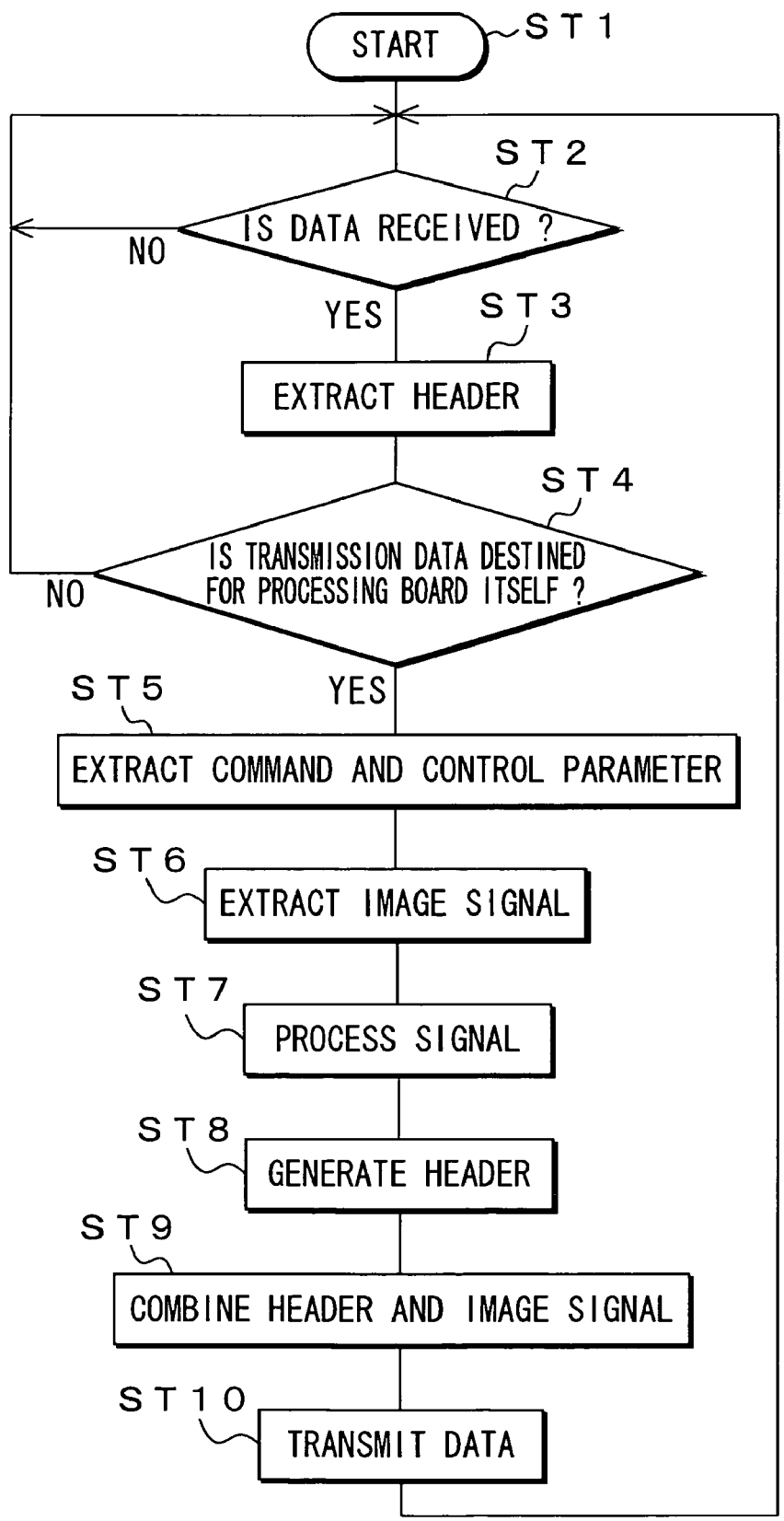
FIG. 12 is a flowchart for showing a procedure of the image-signal processing.

The following will describe image signal processing in the apparatus 300 for processing image signal with reference to a flowchart of FIG. 12.

The processing starts at step ST1 and, at step ST2, the transmission/reception portion 305 decides whether transmission data is received from the remote-control reception portion 107 or any other processing board. If the transmission data is received, it extracts headers DH from the received transmission data at step ST3 and, at step ST4, the process decides whether the transmission data is destined for the processing board itself based on a transmission destination ID included in a beginning header. If the transmission data is not destined for the processing board itself, it returns to step ST2 to decide whether transmission data is received or not. If the transmission data is destined for the processing board itself, on the other hand, it goes to step ST5.

At step ST5, it extracts a command and a control parameter as processing information from the beginning header of the received transmission data. At step ST6, it extracts an image signal SV from the received transmission data. At step ST7, it processes the extracted image signal SV based on the processing information extracted at step ST5, to obtain an image signal SV'. It is to be noted that in image signal processing that accommodates the input board 101, the processing of step ST6 is omitted but, at step ST7, an image signal $V_{in}$ is taken in via the input/output interface 306, to convert the component system as necessary.

Next, at step ST8, a header DH' to be combined with the post-processing image signal SV' is generated. In this case, based on information etc. included in the headers DH extracted at step ST3, a transmission destination processing board is determined. In this case, the determination of the transmission destination involves also utilization of the state signal Sb, sent from any other processing boards and received by the transmission/reception portion 305, that indicates whether it can be used or not and information GI that indicates a state of the processed image signal SV' acquired through the signal processing of step ST7.

Next, at step ST9, the header DH' is combined with the post-processing image signal SV' so that can be generated the transmission data $D_{out}$, which is transmitted by radio at step ST10 from the transmission/reception portion 305 to other processing boards. The process then returns to step ST2. It is to be noted that the image signal processing for the output boards 104 and 105 skips steps ST8-ST10 but involves outputting of the image signals $V_{out1}$ and $V_{out2}$ at step ST7.

Although, in the above-described embodiments, the user has input whether the image signal $V_{in}$ is an SD signal or an HD signal and, if it is the HD signal, whether it is a 1080i signal or a 720p signal, that is, a format of this image signal $V_{in}$ when instructing to "input the image signal $V_{in}$ and output the image signal $V_{out1}$ or $V_{out2}$" through operations on the remote-control transmitter 106, this format of the image signal $V_{in}$ can be known by counting the lines etc. so that it is not always required to input the format thereof.

In this case, contents of header 1 of the transmission data D0 which is generated by the remote-control reception portion 107 and transmitted by radio to the side of the processing board are different from those shown in FIG. 3B. That is, it cannot be known whether the image signal $V_{in}$ is an SD signal or an HD signal, so that in the command region, just a command to "input signal" is described and, in the control parameter region, just whether the image signal $V_{in}$ is of the RGB scheme or the YCbCr scheme is described. In this case, the format of the image signal $V_{in}$ can be known by counting the lines etc. in the input board 101 to which the image signal $V_{in}$ is input, as described above.

Although, in the above embodiments, the format conversion board 102 and the noise cancellation board 103 have been supposed to handle the YCbCr scheme image signal, the present invention can be applied similarly to an embodiment where these format conversion board 102 and noise cancellation board 103 handle the RGB-scheme image signal. In this case, the processing contents performed in the input board 101 and the output boards 104 and 105 are opposite to those in the above-described embodiments. That is, in the input board 101, if the image signal $V_{in}$ is of the YCbCr scheme, processing of converting the YCbCr scheme into the RGB scheme is performed. In the output boards 104 and 105, if the image signals $V_{out1}$ and $V_{out2}$ are to be output in accordance with the YCbCr scheme, processing of converting the RGB scheme into the YCbCr scheme is performed.

Although, in the above embodiments, the output board 104 for outputting an HD signal and the output board 105 for outputting an SD signal have been prepared, they can be integrated into one output board that can be switched (switching) between outputting of the HD signal (1080i signal or 720p signal) and outputting of an SD signal (480i signal). For example, this switching can be performed on the basis of a command and a control parameter described in the command region and the control parameter region respectively of header 2 (see FIG. 3C) included in the transmission data $V_{out}$ transmitted to that output board.

Further, for example, the switching in that case can be performed on the basis of a result of detecting a format of an image signal included in the transmission data $D_{out}$ transmitted to that output board. That is, whether the signal is an SD signal (480i signal) or an HD signal (720p signal or 1080i signal) can be detected by counting the lines between vertical blanking operations. Whether the interlace system or the progressive system is employed, on the other hand, can be decided through a field ID. That is, some bits of the field ID indicate line switching, so that it can be known that if the line switching is indicated, the interlace system is employed and, if the line switching is not indicated, the progressive system is employed.

Although, in the above embodiments, from the remote-control reception portion 107, the transmission data D0 has been output in which header 1 destined for the input board 101 and header 2 destined for the output board 104 or 105 are allocated consecutively, only the header 1 destined for the input board 101 can be used if the format of the output image signal, for example, is fixed. As far as the format of the output image signal is fixed, even if its information is not included in the header DH of the transmission data, the input board 101 and the noise collation board 103 can decide whether format conversion should be performed, on the basis of only information of a format of the input image signal.

Although, in the above embodiments, the noise quantity information acquired by the signal-processing portion 205 in the input board 101 has been described as an example of the information GI that indicates a state of the processed image signal SV', the information GI is not limited to this noise quantity information. For example, if there is a subsequent-stage processing board for adjusting a luminosity, it may be considered that information of a level of the image signal SV' is acquired as the information GI. Further, for example, if there is a subsequent-stage processing board for adjusting colors, it maybe considered that information of levels of color components of the image signal SV' is acquired as the information GI.

Although, in the above embodiments, a transmission destination ID has been described in each header, such a data configuration may be employed that a transmission source ID is described further.

Although, in the above embodiments, the present invention has been applied to the image-signal-processing system 100 having the input board 101, the format conversion board 102, the noise cancellation board 103, and the output boards 104 and 105, the present invention can be applied to an image-signal-processing system having a different board configuration. Further, the present invention can be applied also to an informational-signal-processing system that handles not the image signal but an audio signal or both of the image signal and the audio signal.

Thus has been described the embodiments of the informational-signal-processing system and the like according to the invention. The informational signal is processed based on the processing information included in the headers of the transmission data and, based on the processing information included in the headers, a header including transmission destination information of the processed informational signal and the processing information is generated. The transmission data composed of the header and the processed informational signal is transmitted. Alternatively, the generated header is combined with the processed informational signal so that new transmission data can be generated and is transmitted. Thus, a transmission destination is determined based on the information included in any header of the received transmission data. This avoids a determination control of the transmission destination by the controller. Therefore, the present invention enables an order in which informational signals are processed to be easily set if, for example, their input format or output format is changed or a processing board is added and can be applied to an image-signal-processing system etc. using, for example, plural processing boards. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

The present application contains subject matter related to Japanese patent application No. JP 2003-423254, filed in the Japanese Patent Office on Dec. 19, 2003, the entire contents of which being incorporated herein by reference.

What is claimed is:

1. An apparatus for processing an informational signal, said apparatus comprising:
    data-receiving means for receiving transmission data having a first header, said first header including at least transmission destination information and information indicating processing of the information to be processed at the destination;
    decision means for deciding that the transmission data received by the data receiving means is destined for the apparatus itself for processing the informational signal, based on the transmission destination information included in the first header;
    signal-processing means for processing the informational signal into a processed information signal based on the processing information included in the first header when the decision means decides that the transmission data is destined for the apparatus itself;
    header-generating means for generating, based on the processing information included in the first header, a second header that includes at least second transmission destination information and second processing information of transmission destination relative to the processed informational signal; and
    data-transmitting means for transmitting transmission data comprised of the processed informational signal and the second header generated by the header-generating means.

2. The apparatus for processing an informational signal according to claim 1, further comprising header-combining means for combining the second header generated by the header-generating means with the processed informational signal, to generate the transmission data, wherein
    the data-transmitting means transmits the transmission data combined by the header-combining means.

3. The apparatus for processing informational signal according to claim 1, further comprising separation means for separating the informational signal supplied to the signal-processing means from the transmission data received by the data-receiving means.

4. The apparatus for processing an informational signal according to claim 1, wherein the informational signal that is supplied to the signal-processing means to be processed therein, is different from the transmission data received by the data-receiving means.

5. The apparatus for processing an informational signal according to claim 1, wherein
    the first header of the transmission data received by the data-receiving means includes a first sub-header and a second sub-header;
    the decision means decides whether the transmission data is destined for the apparatus itself for processing the informational signal, based on transmission destination information included in the first sub-header; and
    the second sub-header includes at least transmission destination information of a final transmission destination and processing information of the final transmission destination.

6. The apparatus for processing an informational signal according to claim 1, further comprising information-acquiring means for acquiring information that indicates a state of the processed informational signal, wherein
    the header-generating means determines a transmission destination indicated by the transmission destination information included in the second header based on the information included in the first header and the information acquired by the information-acquiring means.

7. The apparatus for processing an informational signal according to claim 1, further comprising a state signal-receiving means for receiving a state signal transmitted from another apparatus for processing an informational signal, said state signal indicating any one of a state that said another apparatus for processing the informational signal is usable and a state that said another apparatus for processing the informational signal is unusable, wherein
    the header-generating means determines a transmission destination indicated by the transmission destination information included in the second header based on the information included in the first header and the state signal received by the state signal-receiving means.

8. The apparatus for processing an informational signal according to claim 1, further comprising a signal-transmitting means for transmitting a state signal to another apparatus for processing the informational signal, said state signal indicating any one of a state that the apparatus for processing the informational signal is usable and a state that the apparatus for processing the informational signal is unusable.

9. The apparatus for processing an informational signal according to claim 8, wherein the apparatus for processing the informational signal is usable when this apparatus for processing the informational signal is mounted to a predetermined position of a chassis and the apparatus for processing the informational signal is unusable when this apparatus for processing the informational signal is dismounted of the predetermined position of the chassis.

10. A method for processing an informational signal, said method comprising:
    a data reception step of receiving transmission data having a first header, said first header including at least transmission destination information and information indicating processing of the information to be processed at the destination;
    a decision step of deciding that the transmission data received in the data reception step is destined for the apparatus itself for processing the informational signal, based on the transmission destination information included in the first header;
    a signal-processing step of processing the informational signal into a processed information signal based on the processing information included in the first header when the decision step decides that the transmission data is destined for the apparatus itself;
    a header generation step of generating, based on the processing information included in the first header, a second header that includes at least second transmission destination information and second processing information of transmission destination relative to the processed informational signal; and
    a data transmission step of transmitting transmission data comprised of the processed informational signal and the second header generated by the header generation step.

11. The method for processing an informational signal according to claim 10, further comprising a header-combining step of combining the second header generated by the header generation step with the processed informational signal, to generate the transmission data, wherein at the data transmission step, the transmission data combined at the header-combining step is transmitted.

12. A computer-readable medium for recording a program for causing a computer to perform a method for processing an informational signal, said method comprising:
- a data reception step of receiving transmission data having a first header, said first header including at least transmission destination information and information indicating processing of the information to be processed at the destination;
- a decision step of deciding that the transmission data received in the data reception step is destined for the apparatus itself for processing the informational signal, based on the transmission destination information included in the first header;
- a signal-processing step of processing the informational signal into a processed information signal based on the processing information included in the first header when the decision step decides that the transmission data is destined for the apparatus itself;
- a header generation step of generating, based on the processing information included in the first header, a second header that includes at least second transmission destination information and second processing information of transmission destination relative to the processed informational signal; and
- a data transmission step of transmitting transmission data comprised of the processed informational signal and the second header generated by the header generation step.

13. A processing board for processing an informational signal, said processing board comprising:
- a data receiver configured to receive transmission data having a first header, said first header including at least transmission destination information and information indicating processing of the information to be processed at the destination;
- a decision device configured to decide that the transmission data received by the data receiver is destined for the processing board itself, based on the transmission destination information included in the first header;
- a signal processor configured to process the informational signal into a processed information signal based on the processing information included in the first header when the decision device decides that the transmission data is destined for the processing board itself;
- a header generator configured to generate, based on the processing information included in the first header, a second header that includes at least second transmission destination information and second processing information of transmission destination relative to the processed informational signal; and
- a data transmitter configured to transmit transmission data comprised of the processed informational signal and the second header generated by the header generator.

14. The processing board for an informational signal according to claim 13, further comprising a header-combining device configured to combine the second header generated by the header generator with the processed informational signal, to generate the transmission data, wherein
  the data transmitter transmits the transmission data combined by the header-combining device.

15. An informational-signal-processing system having plural apparatuses each for processing informational signal, each apparatus performing predetermined processing on each input informational signal, said apparatuses comprising:
- data-receiving means for receiving transmission data having a first header, said first header including at least transmission destination information and information indicating processing of the information to be processed at the destination;
- decision means for deciding that the transmission data received by the data receiving means is destined for the apparatus itself for processing the informational signal, based on the transmission destination information included in the first header;
- signal-processing means for processing the informational signal into a processed information signal based on the processing information included in the first header when the decision means decides that the transmission data is destined for the apparatus itself;
- header-generating means for generating, based on the processing information included in the first header, a second header that includes at least second transmission destination information and second processing information of transmission destination relative to the processed informational signal; and
- data-transmitting means for transmitting transmission data comprised of the processed informational signal and the second header generated by the header-generating means.

* * * * *